United States Patent
Braithwaite

(10) Patent No.: US 8,043,395 B2
(45) Date of Patent: Oct. 25, 2011

(54) AIR CLEANER CONVERTIBLE FOR SECONDARY AIR INDUCTION

(75) Inventor: Alex Braithwaite, Climax, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 340 days.

(21) Appl. No.: 12/360,900

(22) Filed: Jan. 28, 2009

(65) Prior Publication Data

US 2010/0186354 A1 Jul. 29, 2010

(51) Int. Cl.
*B01D 46/10* (2006.01)
(52) U.S. Cl. ........ 55/385.3; 55/418; 55/419; 55/420; 55/484; 123/198 E
(58) Field of Classification Search .......... 55/385.1, 55/385.3, 498, 502; 123/41.65, 198 E; 180/68.3
See application file for complete search history.

(56) References Cited

U.S. PATENT DOCUMENTS

| | | | |
|---|---|---|---|
| 3,737,002 A * | 6/1973 | Yotsumoto | 180/68.3 |
| 4,878,555 A * | 11/1989 | Yasunaga et al. | 180/68.3 |
| 4,969,939 A | 11/1990 | Machado | |
| 5,526,777 A * | 6/1996 | Taomo et al. | 123/41.65 |
| 5,660,243 A | 8/1997 | Anzalone et al. | |
| 6,395,048 B1 | 5/2002 | Yoder et al. | |
| 6,425,930 B1 * | 7/2002 | Wake et al. | 55/385.3 |
| 6,726,742 B2 | 4/2004 | Arden et al. | |

* cited by examiner

*Primary Examiner* — Duane Smith
*Assistant Examiner* — Minh-Chau Pham
(74) *Attorney, Agent, or Firm* — James Hasselbeck

(57) ABSTRACT

The present invention generally relates to a motor vehicle air cleaner assembly that is field or end user convertible to another variety of air cleaner having secondary air induction. The air cleaner is pre-configured to enable a field modification to provide for secondary air induction for admitting heated secondary air to the air cleaner and air filter to aid in melting snow or ice blockage of the air filter and permitting the vehicle to operate in snow and ice air filter blockage conditions.

7 Claims, 4 Drawing Sheets

AIR CLEANER CONVERTIBLE FOR SECONDARY AIR INDUCTION

TECHNICAL FIELD

The present invention generally relates to an air cleaner assembly for a motor vehicle and, more specifically, to an air cleaner assembly that is convertible to an air cleaner having secondary air induction.

BACKGROUND OF THE INVENTION

Internal combustion engines require a source of combustion air. A typical source for combustion air is outside air which commonly includes particulate contaminants. An air cleaner including an air filter element is normally provided to capture these particulate contaminants before combustion air is delivered to the vehicle engine. When operated in colder climates where heavy or blowing snow is common, snow may be drawn into the air cleaner and lead to eventual blockage of the air filter element, thereby cutting off the supply of combustion air and leading to poor engine performance.

In the prior art, air cleaners are known that include a secondary air inlet having a movable damper or power operated valve operable to open a secondary air supply to the air cleaner when the primary air supply becomes obstructed by snow. One example is U.S. Pat. No. 4,969,939 which discloses an air cleaner equipped with a slideable valve including mechanical linkage extending into the operator cabin and operable by a vehicle operator to admit secondary air into the air cleaner in the event the normal air inlet becomes blocked by snow.

U.S. Pat. No. 6,395,048 discloses an air cleaner having an annular door with an open window that is rotatable between a first and a second position. In the first position outside air is admitted to the air cleaner. In the second position warmer under the hood air is provided to the air cleaner and the normal outside air inlet is blocked. The door is rotated by a mechanical actuator.

As can be understood from the above, many varieties of air cleaners equipped for secondary air induction are known. As can be seen from the prior art, air cleaners equipped for secondary air induction have a number of moving parts, are more complex and are therefore more costly that similar air cleaners lacking secondary air adaptations.

As can be appreciated, at the time of manufacture the ultimate service condition of the vehicles are not typically known and therefore the proper air cleaner type and configuration can not be predetermined. Only a portion of manufactured vehicles find service in northern frigid environments in which heavy snows and air cleaner snow pack conditions can be expected. Providing all manufactured vehicles with more costly secondary air equipped air cleaners is unnecessary and undesirable. Also as can be understood, known air cleaners are either secondary air equipped or are not so equipped. Known air cleaners are not configured for end user conversion to add secondary air induction to an air cleaner after market or in the field.

SUMMARY OF THE INVENTION

The present invention generally relates to an air cleaner assembly for a motor vehicle and, more specifically, to an air cleaner assembly that is field or end user convertible to another variety of air cleaner having secondary air induction. Conversion of the air cleaner is particularly advantageous in locales where weather conditions may result in blockage of the air filter with snow, ice or moisture. For use in such environments the air cleaner is pre-configured to enable a field modification to provide for secondary air induction for admitting heated secondary air to the air cleaner and air filter to aid in melting snow or ice blockage of the air filter snow and permitting the vehicle to operate in snow and ice air filter blockage conditions.

In one aspect of the present invention, an air cleaner for a motor vehicle includes a housing having at least one peripheral wall defining an air inlet opening, an air outlet opening and a chamber therein. An air filter element is received into the chamber with the air filter interposed between and separating the air inlet from the air outlet. The air inlet opening is in air flow communication with the primary air portion of the dirty air face of the filter. The air outlet opening is in air flow communication with the clean air face of the air filter. The peripheral wall or walls define at least a potential secondary air opening that is in communication with a secondary air portion of the dirty air face of the filter. A closure member is provided closing over the secondary air opening. The closure member is removable to convert the air cleaner to an air cleaner fitted for secondary air induction.

In another aspect of the invention, the air cleaner includes a baffle extending between the spaced apart peripheral walls and the dirty air face of the air filter. The baffle divides the dirty air face into the primary air portion and the secondary air portion.

In another aspect of the invention, the removable closure member is provided in the peripheral wall or walls.

In another aspect of the invention, the closure member is a knock-out member formed into or molded in one piece with the peripheral wall. The knock-out member is peripherally surrounded by a weakened region formed into the peripheral wall that is configured and adapted to preferably rupture by the application of force onto the knock-out member, thereby releasing the knock-out member and unblocking the secondary air opening.

In another aspect of the invention, the closure member is a removable captured elastic plug. The plug is sized to be received into the secondary air opening and includes flexible resilient flanges positioned at opposing ends of the plug that are spaced apart to enable the flanges to be sealably and retentively received onto opposing surfaces of the peripheral wall, thereby closing out and prevent air flow through the secondary air opening.

In another aspect of the invention, the air cleaner includes a secondary air inlet fitting having a bore in air flow communication with the secondary air opening. The secondary air inlet fitting includes a first end configured and adapted for air flow connection to a secondary air supply, such as an air induction tube or flexible hose. The secondary air inlet fitting has a second end secured onto an exterior surface of the housing peripheral wall.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Disclosed herein is an improved motor vehicle air cleaner that is end user or field convertible for secondary air induction. The present invention provides an air cleaner that is internally preconfigured to secondary air and field convertible by an end user to add secondary air induction for providing warm secondary air induction to the air cleaner for vehicle operation in cold climates where heavy or blowing snow is expected.

Figure 1:
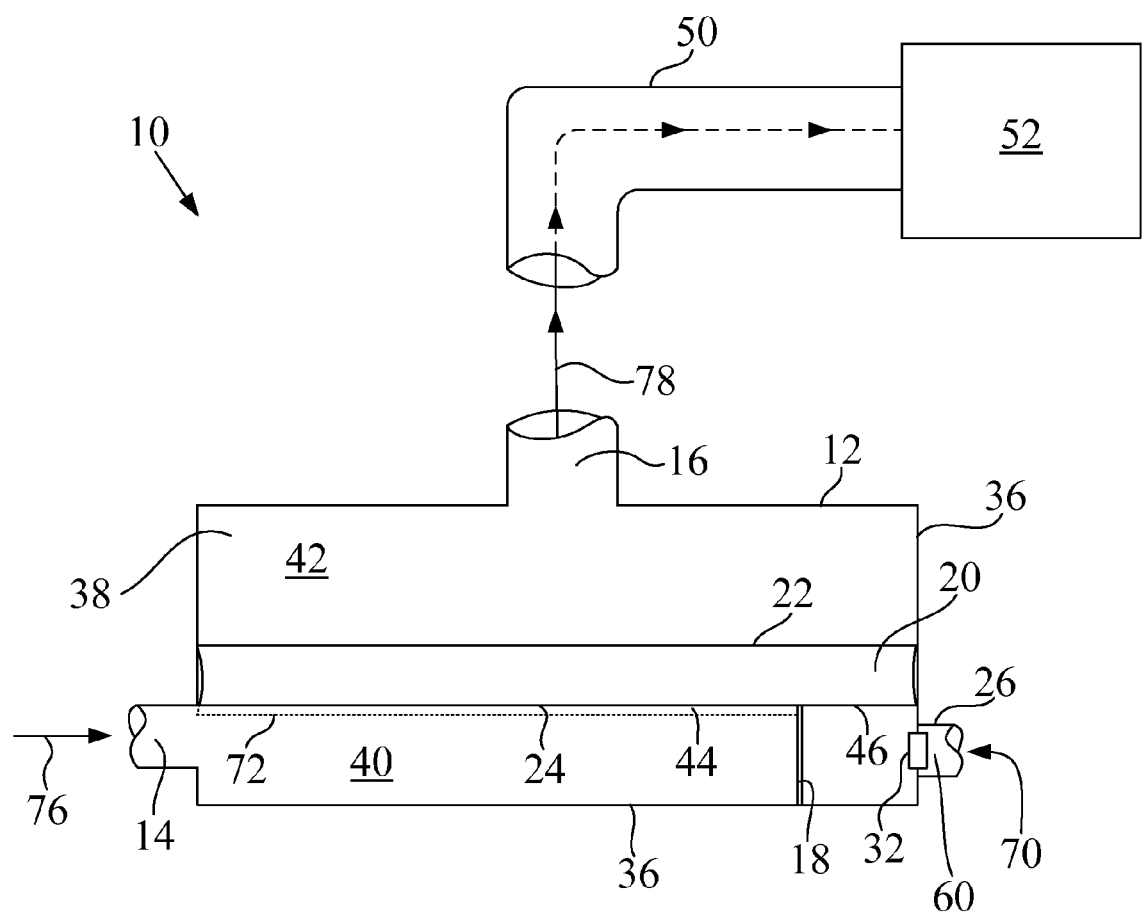
FIG. 1 illustrates a 2D schematic representation of an improved motor vehicle air cleaner 10, consistent with the present invention.

FIG. 1 illustrates a 2D schematic representation of an improved motor vehicle air cleaner 10, consistent with the present invention. The improved air cleaner 10 includes a housing 12 having peripheral walls 36 defining a chamber 38 within. An air filter element 20 is received into the chamber 38 and divides the chamber 38 into a dirty side 40 and a clean side 42. A baffle 18 extends between the peripheral walls 36 and substantially mates against the dirty air face 24 so as to divide the dirty air face 24 of the air filter 20 into a primary air portion 44 and a secondary air portion 46. An inlet air opening 14 is provided through the peripheral wall or walls. An inlet air stream 76 enters the air cleaner 10 through the air inlet opening 14. The air inlet opening 14 is in air flow communication with the primary air portion 44 of the dirty air face 24 of the air filter 20. A baffle 18 substantially blocks the flow of the inlet air stream 76 from reaching the secondary portion 46 of the air filter 20, therefore contaminants (such as snow) that may be present in the inlet air stream 76 do not reach or contaminate the secondary inlet portion 46 of the dirty air face 24 of the air filter 20.

An air outlet opening 16 is provided in the housing 12 and extends through the peripheral wall or walls 36 at the clean side 42 of the chamber 38, with the air outlet opening 16 in air flow communication with the clean air face 22 of the air filter 20. The air outlet opening 16 is connected through a clean air duct 50 to deliver filtered combustion air to a motor vehicle engine 52.

To permit the air cleaner 10 to be adapted for use in cold climates where adverse weather conditions may cause snow to accumulate in the primary air portion of the air filter and result in blockage, the air cleaner 10 is equipped with a closed off secondary air inlet 26. The secondary air inlet 26 includes a removable closure member 32 that closes over the secondary air inlet 26. In conditions where snow blockage is anticipated, the closure member 32 is removable to open the bore 60 of the secondary air inlet 26 and permit warm air from the vehicle engine compartment to reach the secondary air portion 46 of the air filter element 20, thereby providing combustion air to the engine 52 even when the primary air portion 44 of the air filter is blocked by packed snow 72.

In motor vehicles, the air cleaner is typically installed under the hood in the engine compartment which is significantly warmer than ambient air outside the motor vehicle. The air intake for primary air is typically drawn from the outside air rather than using the warmer engine compartment air, and for good reason. The warmer the air temperature becomes in the engine air induction system, the engine charging temperature is thereby increased. An elevated engine charging temperature results in degradation in engine performance, reduction in fuel economy and loss of engine horsepower. This being the case, it is typical vehicle engineering practice to configure the air intake duct to draw engine intake air from outside of the vehicle and not from the engine compartment. Air induction systems that draw in outside air are exposed to the outside elements and may draw airborne particulates such as snow, ice and moisture particles into the air cleaner. As a result, the air filter element 20 may become blocked, starving the engine for combustion air and eventually stalling the engine. Additionally, as air flow is reduced into the engine, the reduced air flow results in a higher developed vacuum at the clean side 42 of the air induction system and thereby within the engine crankcase that may damage engine seals and increase oil blow by. The severity of winter conditions vary by locale, and therefore it is not always necessary or even desirable to provide an air cleaner pre-equipped for warm secondary air intake into the air induction system. Additionally, providing air cleaners equipped for secondary air induction that utilize a movable closure member that can be operated to open and close the secondary air inlet results in increased air cleaner cost and complexity and is therefore undesirable. The present invention provides a field convertible motor vehicle air cleaner that is pre-configured for easy modification in the field to provide a secondary air inlet 26 on the air cleaner housing 12 in those locales in which snow blockage of the air filter element 20 is a problem. By providing this adaptation, the air cleaner is end user convertible to another variety of air cleaner, specifically an air cleaner configured to secondary air induction.

Figure 2A:
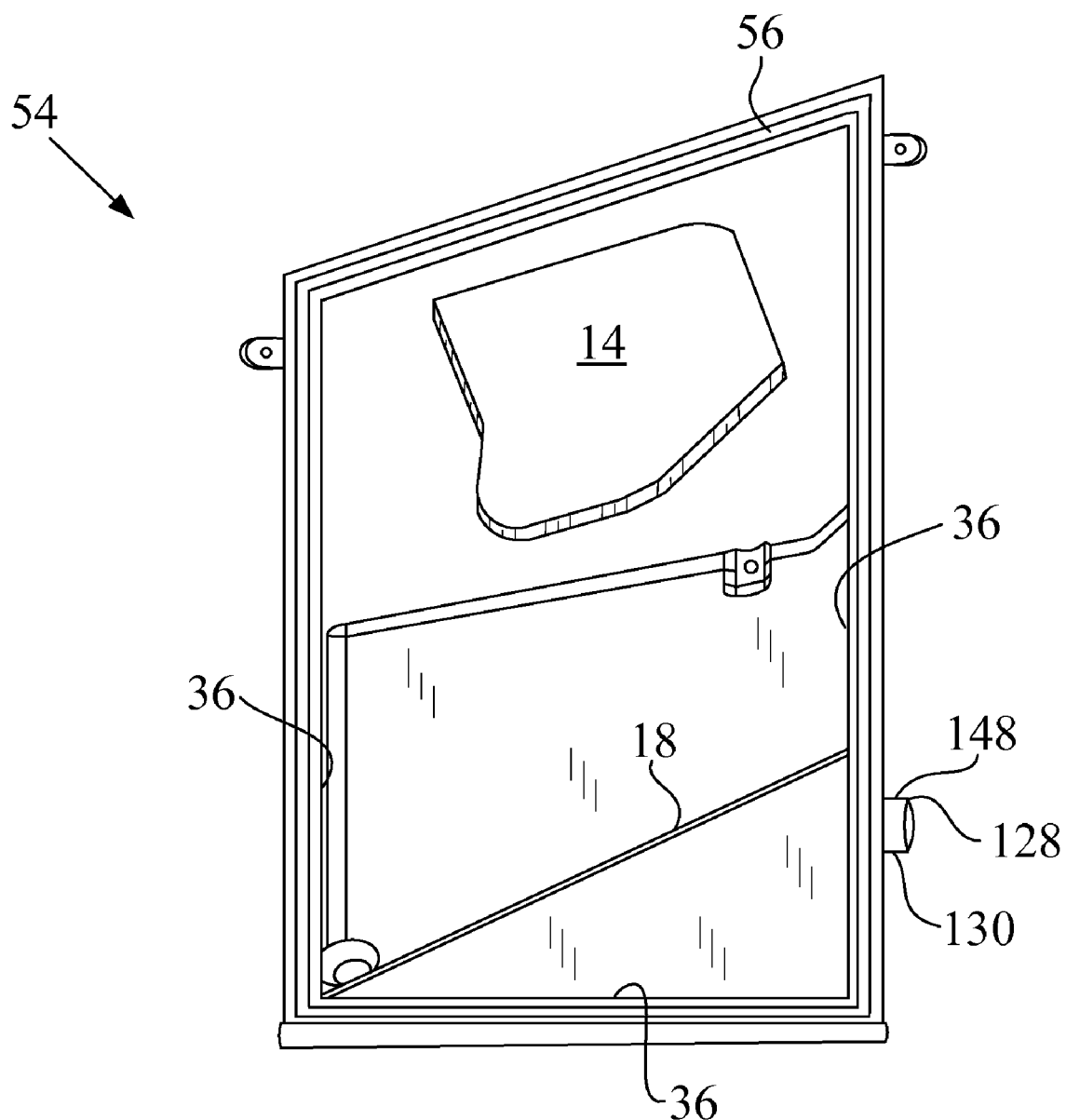
FIG. 2A depicts an interior view of one embodiment of an air inlet portion of an air cleaner housing consistent with the present invention.
Figure 2B:
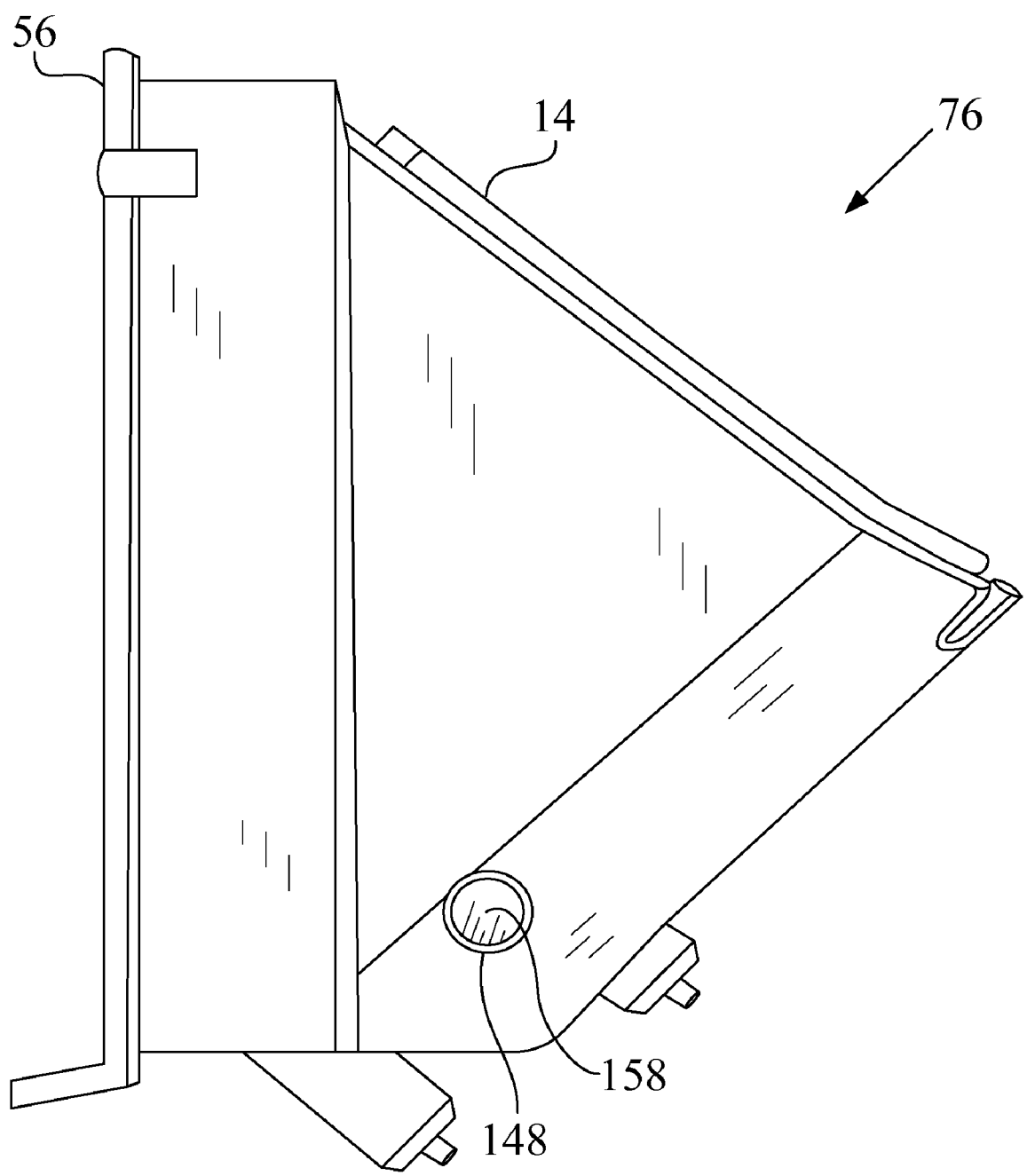
FIG. 2B depicts a side view of the air inlet portion illustrated in FIG. 2A.

Air cleaner housings are often formed in two mating portions and may be aligned and mated to form the closed air filter housing. The mating portions are separable to allow access to and replacement of the air filter element. FIGS. 2A and 2B depicts an air inlet portion of one embodiment of an air cleaner housing consistent with the present invention; this is the mating portion of the air filter housing at the dirty air side or air inlet side of the air filter. FIG. 2A depicts the interior of the air inlet portion 54 of an air cleaner housing. FIG. 2B depicts a side view of the air inlet portion 54 shown in FIG. 2A. The air inlet housing portion 54 includes an air inlet opening 14 that communicates the inlet air stream 76 into the primary air portion 44. The air filter element 20 may include a resilient seal member about its periphery portions. The air inlet housing portion 54 includes a seal face 56 configured to sealably close against the filter seal member so as to prevent inlet air stream 76 from bypassing the air filter element 20. A baffle 18 extends between the peripheral walls 36 and is configured to close against the dirty air side 24 of the air filter element 20 so as to substantially block the flow of inlet air stream 76 from reaching the secondary portion 46 of the air filter 20 (see FIG. 1). Therefore, contaminants (such as snow) that may be present in the inlet air 76 do not contaminate the secondary inlet portion 46 of the air filter 20, as discussed previously with FIG. 1.

A secondary air fitting 148 is secured at one end 130 to an outside surface of a peripheral wall 36 and positioned to be openable into the secondary air portion 46. An opposing end 128 of the secondary air fitting 148 may be configured to join to a secondary air conduit such as an air duct or flexible tube 64 (see FIG. 2C) providing warm secondary air from a secondary air supply 70, such as heated air within the vehicle engine compartment. The secondary air inlet fitting 148 includes a bore 60 (shown in FIG. 1) extending between opposing ends 128 and 130 of the secondary air fitting 148 for the communication of secondary air flow therebetween. A knock-out member 158 (see FIG. 2C) is formed into a portion of the peripheral wall 36 and aligned with the bore 60 of the secondary air fitting 148. The knock-out member 158 separates the bore 60 from the secondary air portion 46 preventing potential air flow of secondary air from entering the air inlet portion 54 of the cleaner housing.

Figure 2C:
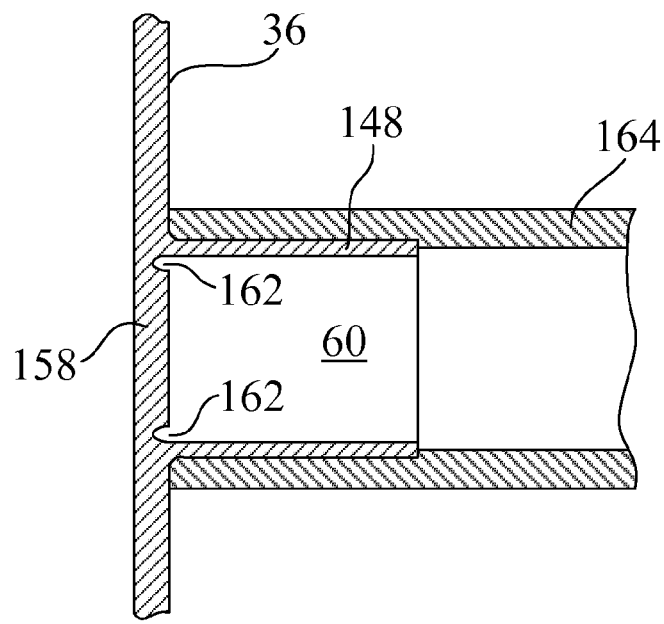
FIG. 2C schematically depicts a partial sectional side view of another embodiment of the present invention in which the secondary air fitting is secured to the peripheral wall and a removable knock-out member is formed into the peripheral wall.

FIG. 2C schematically depicts a partial sectional side view of a particular embodiment of the present invention in which the secondary air fitting 148 is secured to the peripheral wall 36 with the knock-out member 158 formed in one piece with the peripheral wall 36. The knock-out member 158 is one specific embodiment of the removable closure member 32 discussed with FIG. 1. A localized indentation 162 is formed in the peripheral wall 36 about the periphery of the knock-out member 158 providing a weakened region in the wall 36 that may be advantageously ruptured by the application of force onto the knock-out member 158, thereby facilitating removal of the knock-out member 158 from the peripheral wall 36 of the housing and enabling secondary air flow entrance into the secondary air portion 46 through the bore 60 of the secondary air fitting 148. The secondary air fitting is configured and adapted such that an air duct or flexible tube 64 for delivery of heated secondary induction air may be received over and secured onto the secondary air fitting 148. The air duct or flexible tube 64 may be routed in the vehicle to receive warm air from within the engine compartment of the vehicle or other heated air source. The knock-out 158 and secondary air fitting 148 are configured to be field configurable to allow conversion of the air cleaner 10 into an air cleaner configured for secondary air induction. As discussed earlier, this is particularly advantageous in locales where weather conditions warrant the modification but is an unnecessary modification in other locales.

Figure 2D:
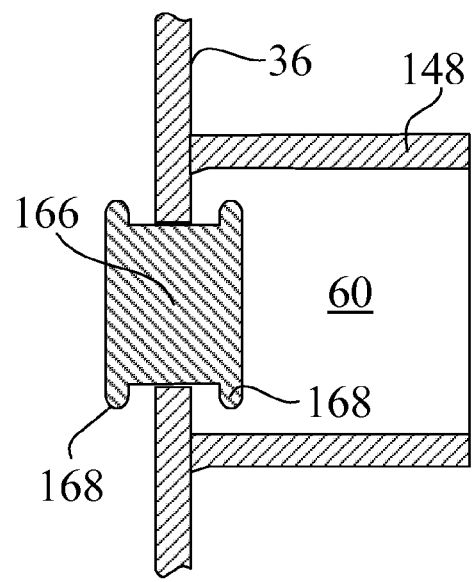
FIG. 2D schematically depicts a partial sectional side view of another embodiment of the present invention in which the removable closure member of FIG. 1 is implemented using a removable captured elastic plug.

FIG. 2D schematically depicts a partial sectional side view of another embodiment of the present invention in which the removable closure member of FIG. 1 is implemented using a removable captured elastic plug 166. The elastic plug 166 preferably includes flexible resilient flanges 168 at its opposing ends that are spaced apart to be sealably received onto opposing surfaces of the peripheral wall 36 so as to retain the elastic plug 166 in position. The elastic plug may be removed by application of force against the plug or by prying upon one of the flanges 168 of the plug 166. Once removed, the elastic plug 166 may be re-inserted at a later time if it is desired to again block off secondary air flow into the air cleaner, if so desired although this is not necessary.

Figure 2E:
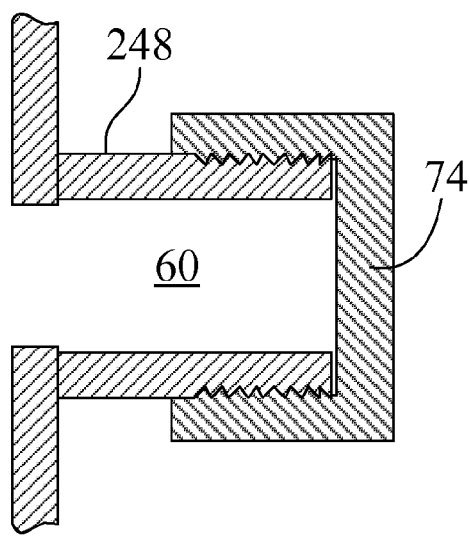
FIG. 2E schematically depicts a partial sectional side view of another embodiment of the present invention in which the removable closure member of FIG. 1 is implemented using a threaded cap.

FIG. 2E schematically depicts a partial sectional side view of another embodiment of the present invention in which the removable closure member of FIG. 1 is implemented using a cap 74 that is threadably and removably secured onto an end of the secondary air inlet fitting 248, thereby closing off the bore 60. The cap 74 may be removed to configure the air cleaner for secondary air induction.

While the best modes for carrying out the invention have been described in detail, those familiar with the art to which this invention relates will recognize various alternative designs and embodiments for practicing the invention within the scope of the appended claims.

The invention claimed is:

1. An air cleaner for a motor vehicle, comprising:
    a housing having an air inlet opening and an air outlet and at least one peripheral wall defining a chamber therein;
    an air filter element received into said chamber and separating said air inlet opening from said air outlet opening,
    wherein said air inlet opening communicates with a primary air portion of a dirty air face of said filter;
    wherein said air outlet opening communicates with a clean air face of said air filter; and
    wherein said at least one peripheral wall includes a secondary air inlet closed off by a removable closure member,
    said secondary air inlet in communication with a secondary air portion of said dirty air face,
    said closure member removable to convert said air cleaner to an air cleaner fitted for secondary air induction,
    a baffle extending between said at least one peripheral wall and said dirty air face of said air filter and substantially mating against said dirty air face of said air filter element,
    said baffle dividing said dirty air face into said primary air portion and said secondary air portion,
    wherein said airflow entering said air inlet opening is prevented from reaching said secondary air portion of said air filter element dirty air face by said baffle, thereby preventing contamination of said secondary air inlet portion,
    wherein said baffle prevents air flow between said primary and said secondary air portions at said dirty air face.

2. The air cleaner according to claim 1, wherein said removable closure member is provided in said at least one peripheral wall.

3. The air cleaner according to claim 2, wherein
    said closure member is a knock-out member integrally formed into said peripheral wall,
    said knock-out member peripherally surrounded by a weakened region in said peripheral wall that is configured and adapted to preferentially rupture by the application of force onto said knock-out member, thereby releasing said knock-out member and unblocking said secondary air inlet.

4. The air cleaner according to claim 1, wherein
    said closure member is a removable captured elastic plug,
    said plug sized to be received into said secondary air inlet,
    said plug including flexible resilient flanges spaced apart so as to enable said flanges to be sealably and retentively received onto opposing surfaces of said peripheral wall.

5. The air cleaner according to claim 3, further comprising:
    a secondary air inlet fitting having a bore in communication with said secondary air inlet,
    said secondary air inlet fitting including
        a first end configured and adapted for air flow connection to a secondary air supply; and
        a second end secured onto an exterior surface of said housing peripheral wall.

6. The air cleaner according to claim 1, further comprising:
    a secondary air inlet fitting having a bore in communication with said secondary air inlet,
    said secondary air inlet fitting including
        a first end configured and adapted for air flow connection to a secondary air supply; and
        a second end secured onto an exterior surface of said housing peripheral wall;
    wherein said closure member is a removable cap provided on said second end of said secondary air inlet fitting.

7. The air cleaner according to claim 6, wherein said cap is threadably secured to said second end of secondary air inlet fitting.

* * * * *